(12) United States Patent
Little

(10) Patent No.: US 9,752,620 B2
(45) Date of Patent: Sep. 5, 2017

(54) DYNAMICALLY ALIGNING, MAINTENANCE FREE, RADIAL INSERT BALL BEARING

(71) Applicant: Schaeffler Technologies AG & Co. KG, Herzogenaurach (DE)

(72) Inventor: Travis Little, Spartanburg, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 102 days.

(21) Appl. No.: 14/949,182

(22) Filed: Nov. 23, 2015

(65) Prior Publication Data

US 2017/0146066 A1    May 25, 2017

(51) Int. Cl.
*F16C 23/08*    (2006.01)
*F16C 33/66*    (2006.01)
*F16C 33/76*    (2006.01)
*F16C 33/78*    (2006.01)

(52) U.S. Cl.
CPC ........ *F16C 33/7896* (2013.01); *F16C 23/084* (2013.01); *F16C 33/767* (2013.01); *F16C 33/7823* (2013.01); *F16C 33/7866* (2013.01)

(58) Field of Classification Search
CPC ...... F16C 23/06; F16C 23/082; F16C 23/084; F16C 23/088; F16C 33/6618; F16C 33/6655; F16C 33/7853; F16C 33/7896
See application file for complete search history.

(56) References Cited

U.S. PATENT DOCUMENTS

| 3,338,584 | A | * | 8/1967 | Nakanishi | F16C 23/084 |
| | | | | | 277/565 |
| 4,089,095 | A | | 5/1978 | Becker | |
| 4,726,696 | A | * | 2/1988 | Dickinson | F16C 23/084 |
| | | | | | 277/563 |
| 5,908,249 | A | * | 6/1999 | Nisley | F16C 19/386 |
| | | | | | 277/351 |
| 5,927,864 | A | * | 7/1999 | Feerick | F16C 23/084 |
| | | | | | 384/482 |
| 8,398,310 | B2 | | 3/2013 | Ehlert et al. | |
| 2011/0019952 | A1 | | 1/2011 | Gutowski et al. | |

FOREIGN PATENT DOCUMENTS

| JP | 2006125626 A | * | 5/2006 | ............ F16C 23/084 |
| WO | 2009131594 | | 10/2009 | |
| WO | 2011005987 | | 1/2011 | |

\* cited by examiner

*Primary Examiner* — Phillip A Johnson
(74) *Attorney, Agent, or Firm* — Volpe and Koenig, P.C.

(57) ABSTRACT

A dynamically aligning, maintenance-free, radial insert ball bearing is provided, including an inner ring and an outer ring. An outer surface of the outer ring has a partial spherical contour. An enclosure ring is located about the outer ring and has an inner surface with a complementary shaped contour to the partial spherical contour, allowing tilting of the outer ring relative to the enclosure ring via sliding contact. Rolling elements are located between the inner and outer rings. First and second inner seals are located on opposing sides of the rolling elements and extend between the inner and outer rings. Outer seals are located on opposing sides of the rolling elements axially outward of the respective first and second inner seals and extend between the enclosure ring and the inner ring to define a lubricant reservoir for the sliding contact of the partial spherical contour in the complementary shaped contour.

15 Claims, 2 Drawing Sheets

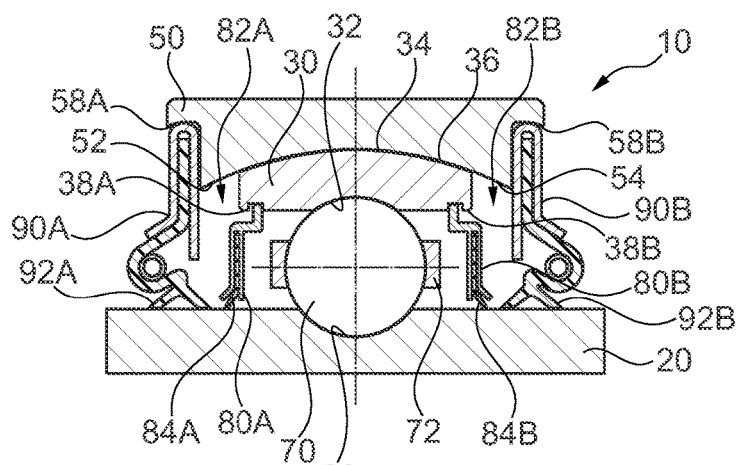
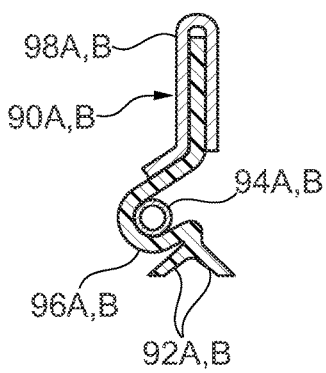
Fig. 1
Fig. 2
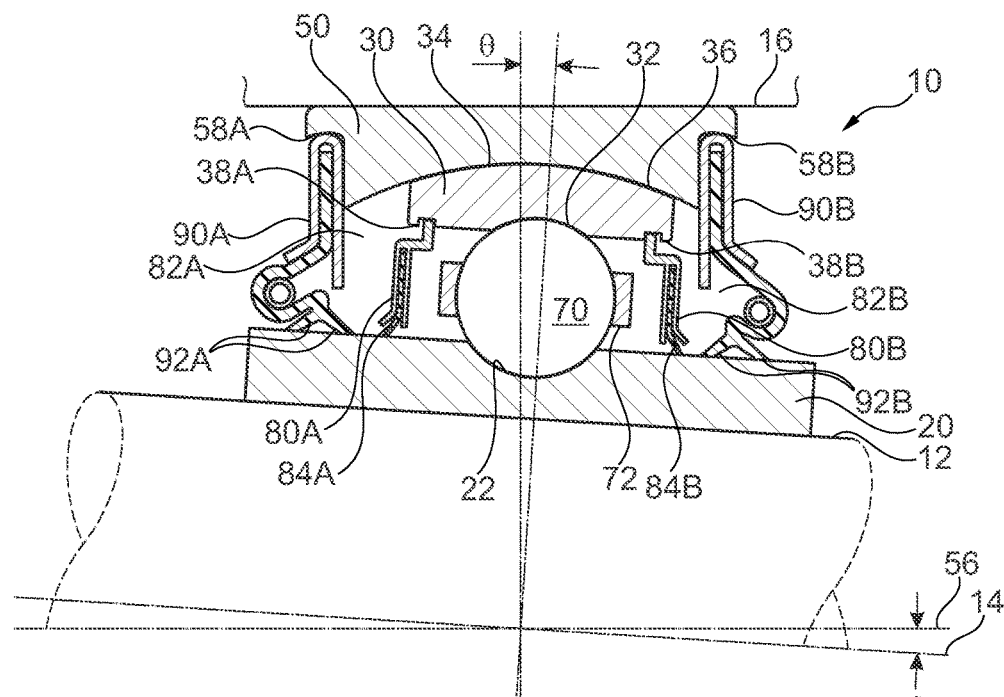
Fig. 3

DYNAMICALLY ALIGNING, MAINTENANCE FREE, RADIAL INSERT BALL BEARING

FIELD OF INVENTION

The present invention relates to a bearing assembly, and more specifically to a dynamically aligning insert ball bearing having multiple seals to provide for maintaining lubrication within the bearing.

BACKGROUND

Self-aligning bearings, such as spherical roller bearings or spherical outer diameter bearings have been used to correct angular and/or radial misalignment between two bearings located on a common shaft or a bearing located in a fixed machine element. Such bearings are configured to permit slight angular movement, usually a one-time adjustment, static misalignment compensation, typically less than three degrees from parallel, between the axis of the shaft and the outer bearing housing. One such arrangement is shown in U.S. Pat. No. 8,398,310 which is incorporated herein by reference as if fully set forth in order to show the typical misalignment of shafts mounted using self-aligning bearings as known in the art. While such bearings are known to include seals for the primary bearing, which typically includes an inner ring, outer ring and rolling elements located therebetween, typically they cannot maintain lubrication at the interface that allows for misalignment of the primary bearing within the enclosure ring that allows for the dynamic self-alignment. These arrangements typically do not provide adequate protection for the spherical mounting surfaces from contamination or provide a complicated mounting that is too large for many applications. Further, during any misaligning movement of greater than half a degree typically any standard seals provided are insufficient.

It would be desirable to provide a self-aligning bearing that allows for a dynamic misalignment during operation with a sealed insert ball bearing as well as lubrication and sealing of the outer spherical arrangement that allows for the self-aligning features to be realized.

SUMMARY

In one embodiment, a dynamically aligning, maintenance-free, radial insert ball bearing is provided. The bearing includes an inner ring having an inner race as well as an outer ring having an outer race. An outer surface of the outer ring has a partial spherical contour. An enclosure ring is located about the outer ring and has an inner surface with a complementary shaped contour to the partial spherical contour. This allows the outer ring to be axially tiltable relative to an axis of the enclosure ring via a sliding contact of the partial spherical contour and the complementary shaped contour on the inner surface of the enclosure ring. Rolling elements are located between the inner ring and the outer ring and contact the inner and outer races. First and second inner seals are located on opposing sides of the rolling elements and extend between the inner ring and the outer ring. First and second outer seals are located on opposing sides of the rolling elements axially outward of the respective first and second inner seals and extend between the enclosure ring and the inner ring to define a lubricant reservoir for the sliding contact of the partial spherical contour in the complementary shaped contour in the inner surface of the enclosure ring.

In one arrangement the enclosure ring includes circumferentially extending grooves on the axial ends thereof, with the first and second outer seals being connected rotationally fast to the enclosure ring in the circumferentially extending grooves.

Preferably, the outer seals each include at least one sealing lip that contacts the inner ring. A circular seal spring that is pre-loaded radially inwardly biases the at least one sealing lip against the inner ring. Preferably, the outer seals each include a circumferentially extending, axially outwardly directed pocket in which the circular seal spring is located. The pocket is formed with a flexible seal material and allows radially inward and outward expansion and contraction of the outer seals to maintain contact between the at least one sealing lip and the inner ring during axial tilting of the inner ring relative to an axis of the enclosure ring. The seals are preferably formed of a nitrile rubber material. However, they could also be formed of a polymeric or other suitable natural or synthetic rubber sealing material. Preferably, a metal or polymeric backing is provided. The backing is preferably annularly shaped and can be located inside the polymeric or rubber sealing material or on an outside thereof.

In another aspect, for each of the outer seals, inner and outer shields are connected to the inner ring that define a first plunger pocket for the first outer seal and a second plunger pocket for the second outer seal. The respective first and second outer seals extend into the respective first and second plunger pockets. The first and second outer seals each include a plurality of sealing lips that contact both the inner and outer shields (which after installation are fixed to and considered part of the inner ring). In this arrangement, the same materials as discussed above as well as the backing can also be provided for the outer seals. Preferably, the inner and outer shields are arranged to provide at least about 2% compression of the seals located in the plunger pockets.

Preferably, the first and second inner seals are connected rotationally fast to the outer ring and each include at least one wiping element that contacts the inner ring.

Preferably, a cage is provided which maintains the rolling elements spaced apart from one another.

Preferably, the outer ring and the enclosure ring are formed of bearing grade steel and the partial spherical contour on the outer surface of the outer ring and the complementary shaped contour on the inner surface of the enclosure ring form a plain bearing. Preferably, this plain bearing is permanently lubricated via a lubricant located between the inner and outer seals.

In a further aspect, lubrication grooves or pockets may be formed in at least one of the partial spherical contour on the outer surface of the outer race or the complementary shaped contour on the inner surface of the enclosure ring. These provide for enhanced lubrication of the partial spherical contour that forms the plain bearing.

Using this arrangement, preferably the lubricant reservoirs between the first and second inner seals and the first and second outer seals can be filled with grease up to 60-80%. The configuration of the outer seals also allows for dynamic movement while maintaining sealing due to the flexible nature of the seals along with the geometry that allows for compression and expansion during dynamic misalignment.

Additional preferred arrangements of the bearing with one or more features of the invention are described below and in the claims.

BRIEF DESCRIPTION OF THE DRAWINGS

The foregoing Summary as well as the following Detailed Description will be best understood when read in conjunction with the appended drawings. In the drawings:

FIG. 1 is a cross-sectional view through a dynamically aligning, maintenance-free, radially insert ball bearing in accordance with a first embodiment.

FIG. 2 is an enlarged cross-sectional view through the outer seal in the bearing of FIG. 1.

FIG. 3 is a cross-sectional view showing the bearing of FIG. 1 in a misaligned condition due to misalignment between a shaft and a mounting surface of the bearing.

DETAILED DESCRIPTION OF THE PREFERRED EMBODIMENTS

Figure 4:
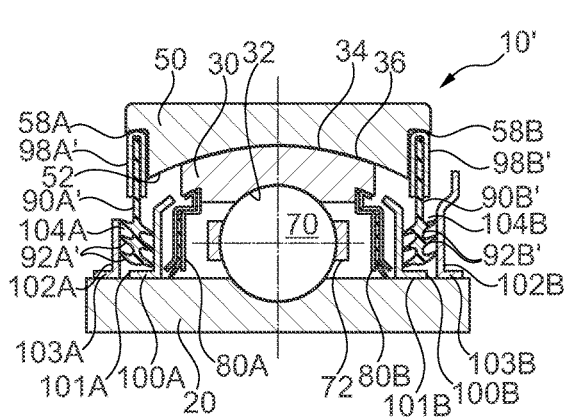
FIG. 4 is a cross-sectional view through a second embodiment of a dynamically aligning, maintenance-free radially insert ball bearing.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Referring to FIGS. 1-3, a dynamically aligning, maintenance-free, radial insert ball bearing 10 in accordance with a first embodiment is shown. This can be used in connection with mounting a shaft 12 having an axis 14 as shown in FIG. 3 or can be used with other types of rotating arrangements in fixed equipment where possible misalignment must be tolerated. As shown in detail in FIGS. 1 and 3, the bearing 10 includes an inner ring 20 having an inner race 22 as well as an outer ring 30 having an outer race 32. An outer surface 34 of the outer ring has a partial spherical contour 36. Preferably, circumferentially extending grooves 38A, 38B are located on the inner surface at the axial ends for receiving inner seals 80A, 80B, as explained in detail below.

Rolling elements 70 are located between the inner and outer bearing rings 20, 30 and contact the inner race 22 and the outer race 32. Preferably, the rolling elements are located in a cage 72 having pockets with the rolling elements 70 being located in at least some of the pockets 74.

An enclosure ring 50 is located about the outer ring 30 and includes an inner surface 52 having a complementary shaped contour 54 to the partial spherical contour 36 such that the primary bearing assembly formed by the inner ring 20, the outer ring 30, and the rolling elements 70 is axially tiltable relative to an axis 56 of the enclosure ring 50 shown in FIG. 3, via sliding contact of the partial spherical contour 36 in the complementary shaped contour 54 in the inner surface 52 of the enclosure ring 50. As shown in FIGS. 1 and 3, preferably circumferentially extending grooves 58A, 58B are located on the axial end faces of the enclosure ring 50 for receiving outer seals 90A, 90B described in detail below.

Preferably, the outer ring 30 and the enclosure ring 50 are formed of bearing grade steel. Additionally, the inner ring 20 is also formed of bearing grade steel. The partial spherical contour 36 on the outer surface 34 of the outer ring 30 and the complementary shape contour 54 on the inner surface 52 of the enclosure ring 50 preferably form a plain bearing. As discussed in detail below, grooves or pockets 56 may be formed in at least one of the partial spherical contour 36 on the outer surface 34 of the outer race 30 or the complementary shaped contour 54 on the inner surface 52 of the enclosure ring 50. These are shown in connection with the second embodiment in FIG. 6, but could apply to any of the embodiments herein.

Referring again to FIGS. 1 and 3, first and second inner seals 80A, 80B, are located on opposing sides of the rolling elements 70 and extend between the inner ring 20 and the outer ring 30. These first and second inner seals 80A, 80B, are preferably connected rotationally fast to the outer ring 30, preferably in the circumferentially extending grooves 38A, 38B provided. Each of these first and second inner seals 80A, 80B include at least one wiping element or lip 84A, 84B that contacts the inner ring 20 in order to provide a seal for the inner primary bearing including the inner race 22, the outer race 32, and the rolling elements 70. This area can be pre-charged with lubricant which is held in place by the first and second inner seals 80A, 80B.

The inner seals 80A, 80B are preferably of the generally known type and include a flexible rubber or polymeric element preferably including the at least one wiping element or lip 84A, 84B as well as a backing element which can be a metal or polymeric material that holds or is adhered to or within the flexible element.

The first and second outer seals 90A, 90B are located on opposing sides of the rolling elements 70 axially outward of the respective first and second inner seals 80A and 80B and extend between the enclosure ring 50 and the inner ring 20 to define a lubricant reservoir 82A, 82B for the sliding contact area of the partial spherical contour 36 and the complementary shaped contour 54 on the inner surface 52 of the enclosure ring 50. As shown in detail in FIGS. 1-3, preferably the first and second outer seals 90A, 90B are connected rotationally fast to the enclosure ring 50 in the circumferentially extending grooves 58A, 58B. The outer seals 90A, 90B each include at least one sealing lip 92A, 92B that contacts the inner ring 20. As shown in the first embodiment 10, the outer seals 90A, 90B each include two sealing lips 92A, 92B that contact the inner ring 20. A circular seal spring 94A, 94B that is preloaded radially inwardly biases the at least one sealing lip 92A, 92B against the inner ring 20. In order to provide excess flexible seal material as well as to hold the seal spring 94A, 94B, each of the outer seals 90A, 90B includes a circumferentially extending, axially outwardly directed pocket 96A, 96B in which the circular seal spring 94A, 94B is located. The pocket 96A, 96B is formed of the flexible seal material and allows radially inward and outward expansion and contraction of the outer seals 90A, 90B to maintain contact between the at least one sealing lip 92A, 92B and the inner ring 20 during axial tilting of the outer ring 30, along with the inner ring 20 and the rolling elements 70, relative to the axis of the enclosure ring 50. The circular seal spring 94A, 94B are preferably formed from coil springs. However, other types of springs or elastic material could be utilized. The circular seal spring 94A, 94B along with the flexible property of the outer seal is 90A, 90B being formed of rubber, synthetic rubber, or another suitable elastomer provides for the sealing contact to be maintained even during axial tilting of the bearing arrangement due to misalignments. In a preferred embodiment, the flexible seal material is nitrile rubber. However, it could also be made of other suitable seal materials, as discussed above.

As shown in detail in FIG. 2, preferably a metal or polymeric backing 98A, 98B is provided, which can be in one or more pieces. In the illustrated embodiment in FIG. 2, the backing 98A, 98B is formed by a ring having a U-shaped cross-section in which the flexible seal material is held. However, it could also be formed by an annular disk molded into the flexible seal material.

The bearing arrangement 10 allows for a wider range of dynamic misalignment than the known prior art self-aligning bearings and further provides for dynamic misalignment since the plain bearing defined between the enclosure ring 50 and the outer ring 30 is provided with lubricant from the lubricant reservoir 82A, 82B formed between the seals 80A, 90A and 80B, 90B. This provides for longer life than the prior known arrangements and also provides a further degree of protection for the primary bearing formed by the inner ring 20, the outer ring 30, and the rolling elements 70.

Figure 5:
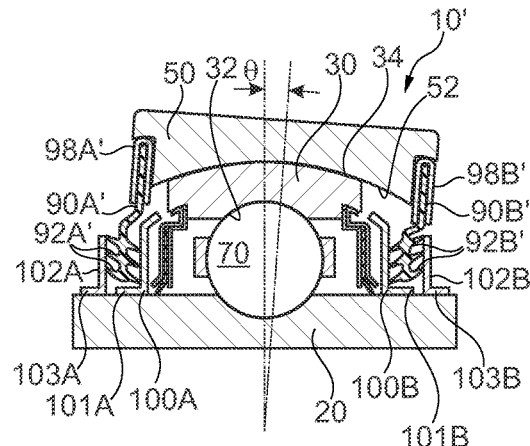
FIG. 5 is a cross-sectional view of the second embodiment shown in FIG. 4 illustrating the dynamic misalignment during operation.
Figure 6:
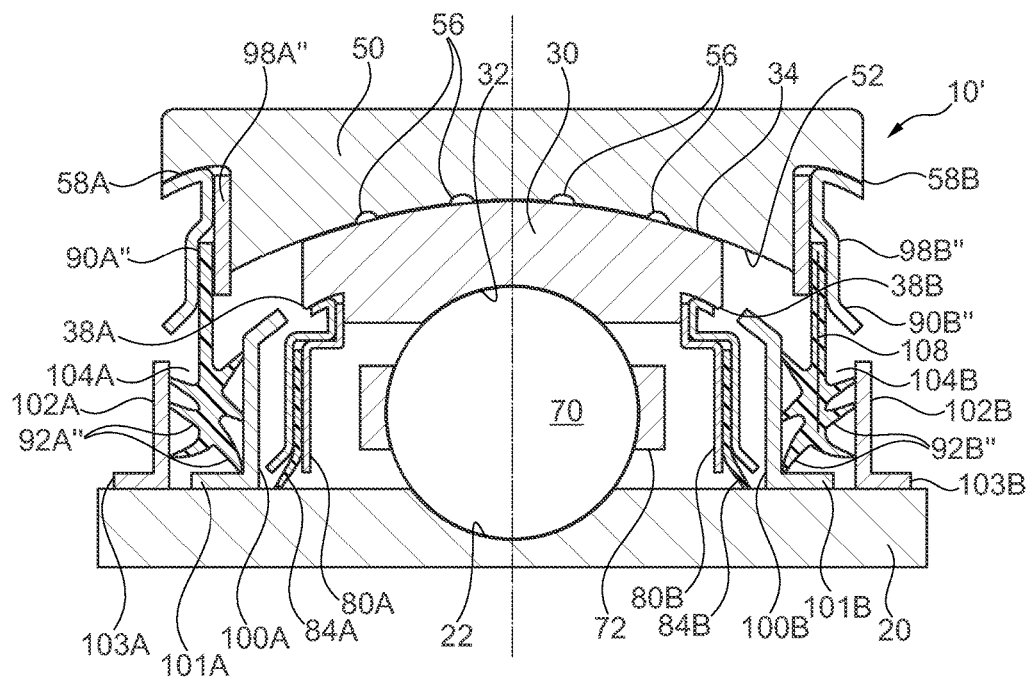
FIG. 6 is an enlarged detailed view of the second embodiment of the dynamically aligning, maintenance-free, radial insert ball bearing of FIG. 4 with a different seal configuration than shown in FIG. 4.

Referring now to FIGS. 4-6, a second embodiment of the dynamically aligning, maintenance-free, radial insert ball bearing 10' is shown. This arrangement is similar to the first embodiment 10 discussed above and like elements have been labeled with the same elements numbers. Here, the first and second outer seals 90A', 90B' are formed as plunger seals that allow for movement and tilting while still maintaining multiple sealing lip contact points. In this arrangement, inner shields 100A, 100B and outer shields 102A, 102B are connected to the inner ring 20 in order to define a first plunger pocket 104A and a second plunger pocket 104B. As shown in detail in FIGS. 4 and 5, the respective first and second outer seals 90A', 90B' extend into the first and second plunger pockets 104A, 104B. The first and second outer seals 90A', 90B' each include a plurality of sealing lips 92A', 92B' that contact the inner and outer shields 100A, 100B; 102A, 102B. In this arrangement, as shown in FIG. 5, multiple lip contact points are maintained even during dynamic misalignment. Preferably, the outer seals 90A', 90B' are formed of nitrile rubber, synthetic rubber, or a suitable elastomer.

Here as in the first embodiment, the outer seals 90A', 90B' include a metal or polymeric backing 98A', 98B'. In the embodiment shown in FIGS. 4 and 5, the backing 98A', 98B' is in the form of a metal ring having a U-shape in cross-section which engages the flexible material and also engages in the grooves 58A, 58B in the enclosure ring 50. Alternatively, the backing 108 could be molded inside the polymeric or rubber sealing material. This is illustrated in connection with the alternate configuration of the second embodiment of the bearing 10' shown in the right side of FIG. 6.

Referring now to FIG. 6, an alternate configuration of the second embodiment of the bearing 10' is shown. Here, the seal lips 92A", 92B" are set at various different angles to the contact surfaces with the inner shield 100A, 100B and the outer shield 102A, 102B. During dynamic misalignment, this ensures that multiple lip contact points remain engaged with the inner and outer shields 100A, 100B; 102A, 102B. The inner and outer shields 100A, 100B; 102A, 102B preferably respectively include axially extending flanges 101A, 101B; 103A, 103B for mounting On the left side of FIG. 6, the backing 98A" is formed as two separate metal rings which are connected together in order to sandwich a flexible portion of the seals 90A", 90B" therebetween. In addition, or alternatively, as shown on the right hand side of FIG. 6, the outer seal 90B" includes an internal reinforcement 108 which can be formed as an annular disk made of a metal or polymeric material. This can be molded inside the flexible portion of the seal 90B".

In operation, a dynamic misalignment of θ degrees is possible (shown in FIGS. 3 and 5) with θ preferably being in the range of up to 5 degrees or more in order to allow for a misaligned shaft to be fully supported by the bearing 10, 10'. Further, a lubricant is provided in the lubricant reservoirs 82A, 82B, to ensure a long, maintenance-free life.

Having thus described various embodiments of the present bearing arrangement in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A dynamically aligning, maintenance-free radial insert ball bearing, comprising:
    an inner ring having an inner race;
    an outer ring having an outer race, an outer surface of the outer ring having a partial spherical contour;
    an enclosure ring located about the outer ring having an inner surface with a complementary shaped contour to the partial spherical contour, such that the outer ring is axially tiltable relative to an axis of the enclosure ring via sliding contact of the partial spherical contour in the complementary shaped contour on the inner surface of the enclosure ring;
    rolling elements located between the inner and outer bearing rings and contacting the inner race and the outer race;
    first and second inner seals located on opposing sides of the rolling elements and extending between the inner ring and the outer ring;
    first and second outer seals located on opposing sides of the rolling elements axially outward from the respective first and second inner seals and extending between the enclosure ring and the inner ring to define a lubricant reservoir for the sliding contact of the partial spherical contour in the complementary shaped contour on the inner surface of the enclosure ring.

2. The bearing of claim 1, wherein the enclosure ring includes circumferentially extending grooves on the axial ends thereof, and the first and second outer seals are connected rotationally fast to the enclosure ring in the circumferentially extending grooves.

3. The bearing of claim 2, wherein the outer seals each include at least one sealing lip that contacts the inner ring, and a circular seal spring pre-loaded radially inwardly that biases the at least one sealing lip against the inner ring.

4. The bearing of claim 3, wherein the outer seals each include a circumferentially extending, axially outwardly directed pocket in which the circular seal spring is located, the pocket being formed of flexible seal material and allowing radially inward and outward expansion and contraction of the outer seals to maintain contact between the at least one sealing lip and the inner ring during axial tilting of the outer ring relative to an axis of the enclosure ring.

5. The bearing of claim 4, wherein the outer seals are formed of nitrile rubber.

6. The bearing of clam 4, wherein the outer seals comprise a polymeric or rubber sealing material and a metal or polymeric backing.

7. The bearing of claim 6, wherein the backing is annular shaped and located inside the polymeric or rubber sealing material.

8. The bearing of claim 2, further comprising, for each of the outer seals, inner and outer shields connected to the inner ring that define a first plunger pocket for the first outer seal and a second plunger pocket for the second outer seal, the respective first and second outer seals extending into the respective first and second plunger pockets, and the first and second outer seals each include a plurality of sealing lips that contact both the inner and outer shields.

9. The bearing of claim 8, wherein the outer seals are formed of nitrile rubber.

10. The bearing of clam 8, wherein the outer seals comprise a polymeric or rubber sealing material and a metal or polymeric backing.

11. The bearing of claim 10, wherein the backing is annular shaped and located inside the polymeric or rubber sealing material.

12. The bearing of claim 1, wherein the first and second inner seals are connected rotationally fast to the outer ring and each include at least one wiping element that contacts the inner ring.

13. The bearing of claim 1, further comprising a cage having pockets, and the rolling elements are located in at least some of the pockets.

14. The bearing of claim 1, wherein the outer ring and the enclosure ring are formed of bearing grade steel, and the partial spherical contour on the outer surface of the outer race and the complementary shaped contour on the inner surface of the enclosure ring form a plain bearing.

15. The bearing of claim 14, further comprising lubrication grooves or pockets formed in at least one of the partial spherical contour on the outer surface of the outer race or the complementary shaped contour on the inner surface of the enclosure ring.

\* \* \* \* \*